Oct. 19, 1926.                                      1,603,894
F. K. BENEDICT
CLAMP SCREW FOR SAW SWAGES
Filed Feb. 27, 1926
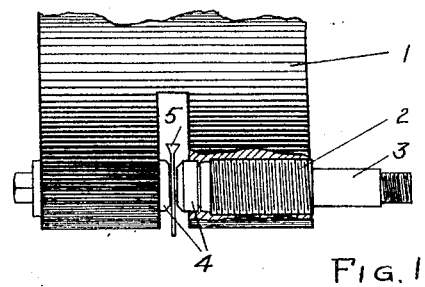
F1G. 1.
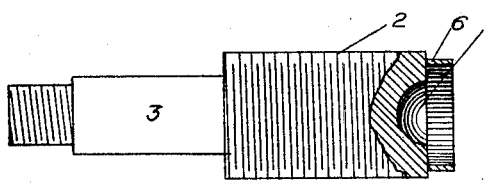
F1G. 2.
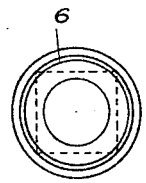
F1G. 3.
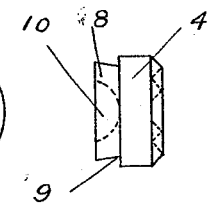
F1G. 4.
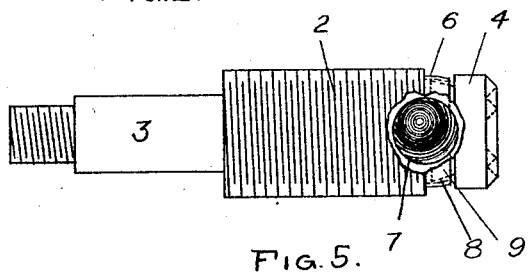
F1G. 5.
INVENTOR
Frederic K. Benedict
BY
George B Willcox
ATTORNEY Patented Oct. 19, 1926.

1,603,894

UNITED STATES PATENT OFFICE.

FREDERIC K. BENEDICT, OF BIG RAPIDS, MICHIGAN, ASSIGNOR TO HANCHETT SWAGE WORKS, OF BIG RAPIDS, MICHIGAN, A CORPORATION OF MICHIGAN.

CLAMP SCREW FOR SAW SWAGES.

Application filed February 27, 1926. Serial No. 91,103.

This invention relates to saw swages of that class in which a head comprising a piece of metal of cylindrical or other suitable shape is formed with a slit to receive a saw blade and has a threaded hole therein at right angles to the plane of the slit. In such swages a clamping screw is inserted in the threaded hole, and is tightened to clamp the saw, or loosened to release it, usually by a handle secured to a shank formed on the outer end of the screw.

The usual clamping screw has heretofore been made in one piece, although it has more recently become customary in saw swage design to provide a separate saw-engaging head or cap on the inner end of the screw. The cap has been held in place, sometimes by means of a spring, and sometimes by an axial shank or spindle of small diameter that projects from the head and is somewhat loosely received in a hole bored longitudinally in the end of the screw, or, in some instances extending entirely through the screw from end to end.

In its broader aspect the inventive idea of my present improvement is concerned with a new and useful construction and arrangement of the above mentioned parts, namely, the clamp screw and its cap.

More specifically, the present invention is found in my novel construction of the slightly articulated joint by which the saw-engaging end-member or cap is joined to the threaded body of the screw.

The function of my improved joint structure, as in all other such articulated joints, is to permit the screw to rotate freely with respect to the cap while enabling the latter to adjust itself to the face of the blade without rotating, to prevent marring the surface of the blade by cutting or denting.

In its preferable embodiment, described herein, my invention is adapted to accomplish the stated results in a better manner than has been done heretofore. This joint, which is of the ball-and-socket type, is so constructed that both the screw and the cap are rendered capable of being manufactured more accurately and economically, and can be assembled more easily and quickly by workmen of merely ordinary skill, than has been possible with the articulated joints above mentioned as having been previously devised for the clamp screws of saw swages.

With the foregoing and certain other objects in view, which will appear later in the specifications, my invention comprises the devices described and claimed and the equivalents thereof.

In the drawings, Fig. 1 is a front view, partly broken away, showing my improved clamp screw applied to the body of a saw swage.

Fig. 2 is a side view partly broken away, showing the threaded part of the clamping screw.

Fig. 3 is an end view of the part shown in Fig. 2.

Fig. 4 is a side view of the saw-engaging cap-member of the clamp screw.

Fig. 5 is a side view, partly broken away, showing the device assembled.

Referring now to the details of the drawings by numerals, 1 represents the head of a saw swage, formed as usual, with a slit to receive a saw blade. The head is formed with an aperture, threaded and communicating with the slit at right angles to the plane of the slit. In the threaded aperture is the saw-clamping screw having its main part or body 2 threaded, and its outer end or shank formed to receive an operating handle, not shown.

The inner end of screw 2 carries the articulated cap 4 that engages the saw 5 to clamp it in the head 1.

The joint structure will now be described. An axially projecting tubular shell is formed on the inner end of screw body 2, and the base of the tubular shell is formed with a substantially hemispherical socket 7 to receive a suitable ball, as shown in Fig. 5.

The articulated cap structure, as shown in Fig. 4, consists in the flat faced saw-engaging member 4, formed with a shank 8, that preferably is tapered as at 9, having its greatest diameter at its outer end. The large end of shank 8 is rotatably received in the tubular shell 6, and a ball socket 10, formed in the end of the shank receives the ball as in Fig. 5. The outer edge or rim of shell 6 is then peened or rolled or pressed inwardly at places adjacent the reduced part of taper 9, whereby the shank 8 is retained and the cap 4 is held in freely rotatable and slightly articulated relation to screw 2.

My improved ball joint is thus seen to include in its construction a novel ball-seat shank on the saw-engaging cap, wherein the shank is tapered to secure more freedom of articulating movement in order to insure a fairer clamping effect upon the face of the saw blade.

Moreover, my improved construction of the end of the screw enables the larger end of the tapered shank on the cap to be snugly received in the tubular shell which I form in the end of the screw, and when the shank is forced farther into the opening, during the act of clamping, so as to take its seat upon the ball, the taper permits the shank to fit loosely in the tubular shell. There is practically no tendency to rotate when the screw is rotated to clamp the saw blade, and the saw-engaging cap can not bind on the screw.

When the cap is assembled with the threaded body to form the completed clamp screw, and the device is screwed into position to clamp a saw blade, the saw-engaging cap fairly and flatly seats itself upon the side of the blade. While the screw is being set up tight, there is no grinding of the screw end into the saw blade, and no tendency for it to turn, twist, and cut or indent its way into the blade.

The construction and arrangement of the parts enables them to be made and assembled cheaply and quickly in quantity production.

Having thus described my invention, what I claim and desire to secure by Letters Patent is:

1. In a swage having a head formed with a slit to receive a saw blade and having an aperture threaded and communicating with said slit at right angles to the plane thereof, a saw-clamping screw in said threaded aperture, a tubular shell on the inner end of said screw, the screw formed with a socket at the base of the tubular shell, a ball seated in said socket, a saw-engaging cap formed with a shank having its greatest diameter at its outer end and rotatably received in said tubular shell, the end of said shank formed with a ball socket, the rim of said shell projecting inwardly at places adjacent the reduced part of said shank, whereby the shank is retained and the cap is held in rotatable and slightly articulated relation to said screw.

2. In a saw swage, a clamping screw having a bearing cap thereon, an articulated ball-joint connection between said screw and cap, said connection including a tapered shank on said cap, a tubular member on said screw to receive said tapered shank, a ball seated between the ends of said screw and shank, the rim of said shell formed with an inwardly projecting part adapted to retain said tapered shank, for the purposes set forth.

In testimony whereof, I affix my signature.

FREDERIC K. BENEDICT.